US012589733B2

(12) United States Patent
Tagawa

(10) Patent No.: US 12,589,733 B2
(45) Date of Patent: Mar. 31, 2026

(54) DETERMINATION APPARATUS OF CENTER OF GRAVITY POSITION, AND DETERMINATION METHOD THEREOF

(71) Applicant: IHI CORPORATION, Tokyo (JP)

(72) Inventor: Satoru Tagawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 190 days.

(21) Appl. No.: 18/228,011

(22) Filed: Jul. 31, 2023

(65) Prior Publication Data

US 2023/0373468 A1 Nov. 23, 2023

Related U.S. Application Data

(63) Continuation of application No. PCT/JP2022/003138, filed on Jan. 27, 2022.

(30) Foreign Application Priority Data

Feb. 8, 2021 (JP) ................................. 2021-018057

(51) Int. Cl.
*B60W 30/045* (2012.01)
*B60W 40/112* (2012.01)

(52) U.S. Cl.
CPC ........ *B60W 30/045* (2013.01); *B60W 40/112* (2013.01)

(58) Field of Classification Search
CPC .. B60W 30/045; B60W 40/112; B60W 30/04; B60W 2520/105; B60W 2540/18; B60W 2552/30; B60W 40/12; B60W 40/13; B60W 40/072

USPC ........................................................... 701/41
See application file for complete search history.

(56) References Cited

U.S. PATENT DOCUMENTS

| | | | |
|---|---|---|---|
| 2009/0024269 A1 | 1/2009 | Shorten et al. | |
| 2010/0063682 A1 | 3/2010 | Akaki | |
| 2015/0367857 A1 | 12/2015 | Kozuka et al. | |
| 2017/0202131 A1* | 7/2017 | Bunderson | B60W 10/04 |
| 2018/0154935 A1* | 6/2018 | Ohsugi | G01S 13/931 |
| 2020/0231167 A1 | 7/2020 | Zhang et al. | |

(Continued)

FOREIGN PATENT DOCUMENTS

| | | |
|---|---|---|
| DE | 10 2017 220 860 A1 | 3/2019 |
| JP | H06-048226 A | 2/1994 |

(Continued)

OTHER PUBLICATIONS

JP-2012202882-A—English Translation—Shindo et al. (Year: 2011).*

(Continued)

*Primary Examiner* — Scott A Reinbold

(57) ABSTRACT
A determination apparatus of a center of gravity position includes a vehicle on which a cargo is loadable, a self-location detector that acquires self-location data of the vehicle, a turning parameter generator that calculates a turning parameter based on the self-location data, a steering detector that detects a steering control value of the vehicle, a memory that stores reference data, a comparator that compares the turning parameter calculated by the turning parameter generator and the steering control value detected by the steering detector with the reference data, and a determiner that determines a center of gravity position of the vehicle or the cargo based on comparison results of the comparator.

6 Claims, 5 Drawing Sheets

(56) References Cited

U.S. PATENT DOCUMENTS

| | | | |
|---|---|---|---|
| 2020/0324811 A1 | 10/2020 | Okeya et al. | |
| 2021/0300470 A1* | 9/2021 | Kitano | G08G 1/0968 |
| 2022/0024464 A1* | 1/2022 | Katsuyama | B60W 40/13 |
| 2022/0032911 A1* | 2/2022 | Kim | B60W 30/045 |
| 2022/0041158 A1* | 2/2022 | Notohardjono | G06F 30/27 |

FOREIGN PATENT DOCUMENTS

| | | | |
|---|---|---|---|
| JP | 2003-320914 A | | 11/2003 |
| JP | 2005-200212 A | | 7/2005 |
| JP | 4060031 B2 | | 3/2008 |
| JP | 2009-214768 A | | 9/2009 |
| JP | 2012-022672 A | | 2/2012 |
| JP | 2012-051425 A | | 3/2012 |
| JP | 2012202882 A | * | 10/2012 |
| JP | 2019-084902 A | | 6/2019 |
| JP | 2022103896 A | * 7/2022 | B66F 9/24 |
| WO | 2014/122786 A1 | | 8/2014 |

OTHER PUBLICATIONS

JP-2022103896-A—English Translation—Sugimoto et al. (Year: 2020).*

Kichun Jo et al., "Distributed Vehicle State Estimation System Using Information Fusion of GPS and In-vehicle Sensors for Vehicle Localization," 2011 14th International IEEE Conference on Intelligent Transportation Systems, Washington, DC, USA, Oct. 5-7, 2011.

European Patent Office, "Extended European Search Report", issued in European Patent Application No. 22749607.2, which is a counterpart to U.S. Appl. No. 18/228,011, on Jan. 17, 2025, 8 pages.

Korean Intellectual Property Office, Official Action, issued in Korean Patent Application No. 10-2023-7027579, which is a counterpart to U.S. Appl. No. 18/228,011, on Jul. 21, 2025, 5 pages.

* cited by examiner

DETERMINATION APPARATUS OF CENTER OF GRAVITY POSITION, AND DETERMINATION METHOD THEREOF

CROSS REFERENCE TO RELATED APPLICATIONS

This application is a continuation application of International Application No. PCT/JP2022/003138, filed on Jan. 27, 2022, which claims priority to Japanese Patent Application No. 2021-018057, filed on Feb. 8, 2021, the entire contents of which are incorporated by reference herein.

BACKGROUND

1. Technical Field

The present disclosure relates to a determination apparatus of a gravity center of a cargo loaded on a vehicle, and a determination method thereof.

2. Description of the Related Art

A Japanese Granted Patent Publication No. 4060031 (Patent Literature 1) discloses an apparatus for detecting uneven loading of a cargo loaded on a vehicle by using height sensors installed on left and right sides of the vehicle. When unevenness of a cargo is detected by the apparatus, a warning is output against a risk of a rollover of the vehicle.

SUMMARY

In the apparatus disclosed in the Patent Literature 1, it is required to install the additional height sensors on the right and left sides of the vehicle, respectively, in order to detect the uneven loading of the cargo.

An object of a determination apparatus and a determination method of a center of gravity position according to the present disclosure is to determine a center of gravity position of a vehicle or a cargo loaded on a vehicle, regardless of presence or absence of height sensors.

A determination apparatus of a center of gravity position according to the present disclosure includes: a vehicle on which a cargo is loadable; a self-location detector that acquires self-location data of the vehicle; a turning parameter generator that calculates a turning parameter based on the self-location data; a steering detector that detects a steering control value of the vehicle; a memory that stores reference data; a comparator that compares the turning parameter calculated by the turning parameter generator and the steering control value detected by the steering detector with the reference data; and a determiner that determines a center of gravity position of the vehicle or the cargo based on comparison results of the comparator.

In a determination method of a center of gravity position according to the present disclosure, a center of gravity position of a vehicle on which a cargo is loadable or that of the cargo is determined. The method includes: constructing, as reference data, relationship between a steering control value of the vehicle and a turning parameter corresponding to it when the cargo is in a predetermined state, preliminarily; calculating a turning parameter based on an actual self-location history of the vehicle by using a self-location detection function of the vehicle; and determining the center of gravity position of the vehicle or the cargo by comparing the steering control value used for an actual turning and the turning parameter calculated based on the self-location history with the reference data.

By the determination apparatus or the determination method of a center of gravity position according to the present disclosure, it becomes possible to determine a center of gravity position of a vehicle or a cargo loaded on a vehicle, regardless of presence or absence of height sensors.

DESCRIPTION OF THE EMBODIMENTS

Hereinafter, an embodiment will be described with reference to the drawings.

Figures 1A, 1B:
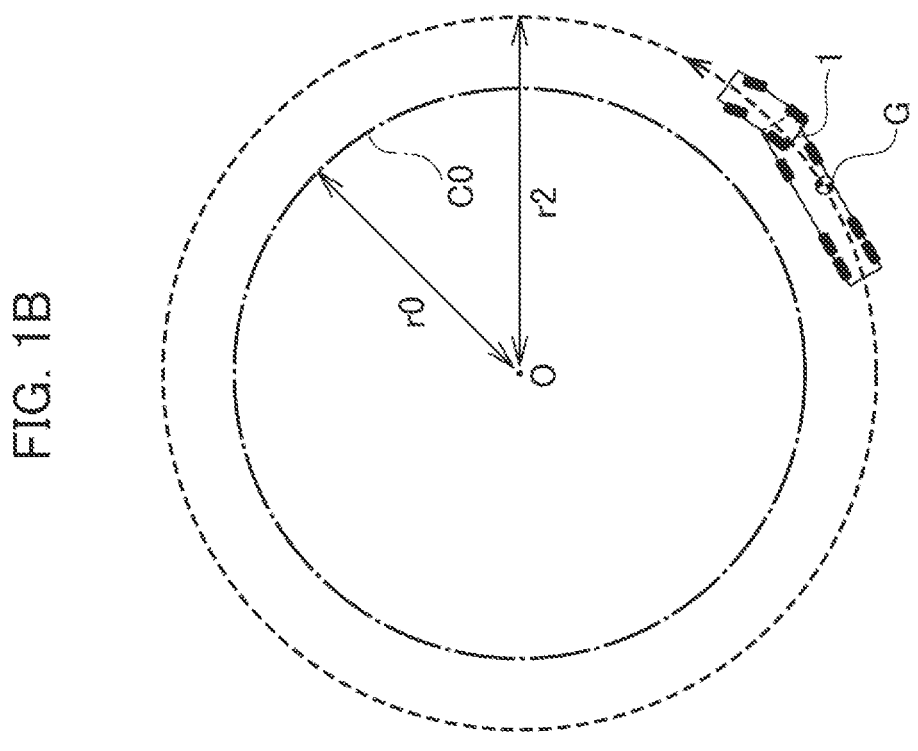
FIG. 1A is a plan view showing relationship between a center of gravity position of a loaded cargo and turning characteristics of a vehicle in a case where the center of gravity position exists on a side of a turning center (turning inner side)
FIG. 1B is a plan view showing relationship between a center of gravity position of a loaded cargo and turning characteristics of a vehicle in a case where the center of gravity position exists on a turning outer side.

In the present disclosure, a center of gravity position of a cargo loaded on a vehicle (or a center of gravity position of a vehicle) is determined based on relationship between the center of gravity position of the loaded cargo and turning characteristics of the vehicle. First, the relationship between the center of gravity position of the loaded cargo and the turning characteristics of the vehicle is explained with reference to FIG. 1A and FIG. 1B. Ideally, a center of gravity position G of a cargo loaded on a vehicle 1 should be located on a front-back center line of the vehicle in a plan view. A turning locus C0 for a given steering control value when the center of gravity position G is on the front-rear center line is shown in FIG. 1A and FIG. 1B. The turning radius of the turning locus C0 is defined as a proper turning radius r0. That is, when the vehicle 1 is turned by use of the given steering control value while the cargo is properly loaded, the vehicle 1 draws the turning locus C0 (a circle having the proper turning radius r0).

However, as shown in FIG. 1A, if the center of gravity position G of the loaded cargo shifts to a side of the turning center O (the turning inner side), an actual turning radius r1 resulting from the given steering control value becomes smaller than the proper turning radius r0. On the other hand, as shown in FIG. 1B, if the center of gravity position G of the loaded cargo shifts to the turning outer side, an actual turning radius r2 resulting from the given steering control value becomes larger than the proper turning radius r0. In other words, the inventor has newly discovered that a center of gravity position can be determined from turning characteristics. Note that the steering control value is a value used for a turning control to turn the vehicle 1 (a control to steer steered road wheels), and is specifically a steering angle of a steering wheel 4a (a steering angle request value) or a steered angle or a target steered angle of the steered road wheels (a steering angle control value), or both.

In the above explanation of the determination of the center of gravity position based on the turning characteristics, a turning parameter indicating turning characteristics as a result of turning of the vehicle based on the steering control value is a turning radius (see r0 to r2 in FIG. 1A and FIG. 1B). However, a turning curvature (=1/turning radius), which is a reciprocal of a turning radius, can also be used as a turning parameter indicating turning characteristics. In the present embodiment to be explained hereinafter, a case where a turning curvature (=1/turning radius) is used as a turning parameter will be used as an example. Note that a turning parameter is a parameter obtained from a vehicle's running path, and is a parameter that indicates turning characteristics resulting from a steering control using a steering control value mentioned above for a vehicle. The turning parameter is calculated based on self-location data of a vehicle acquired by its self-location detector described later.

Figure 2:
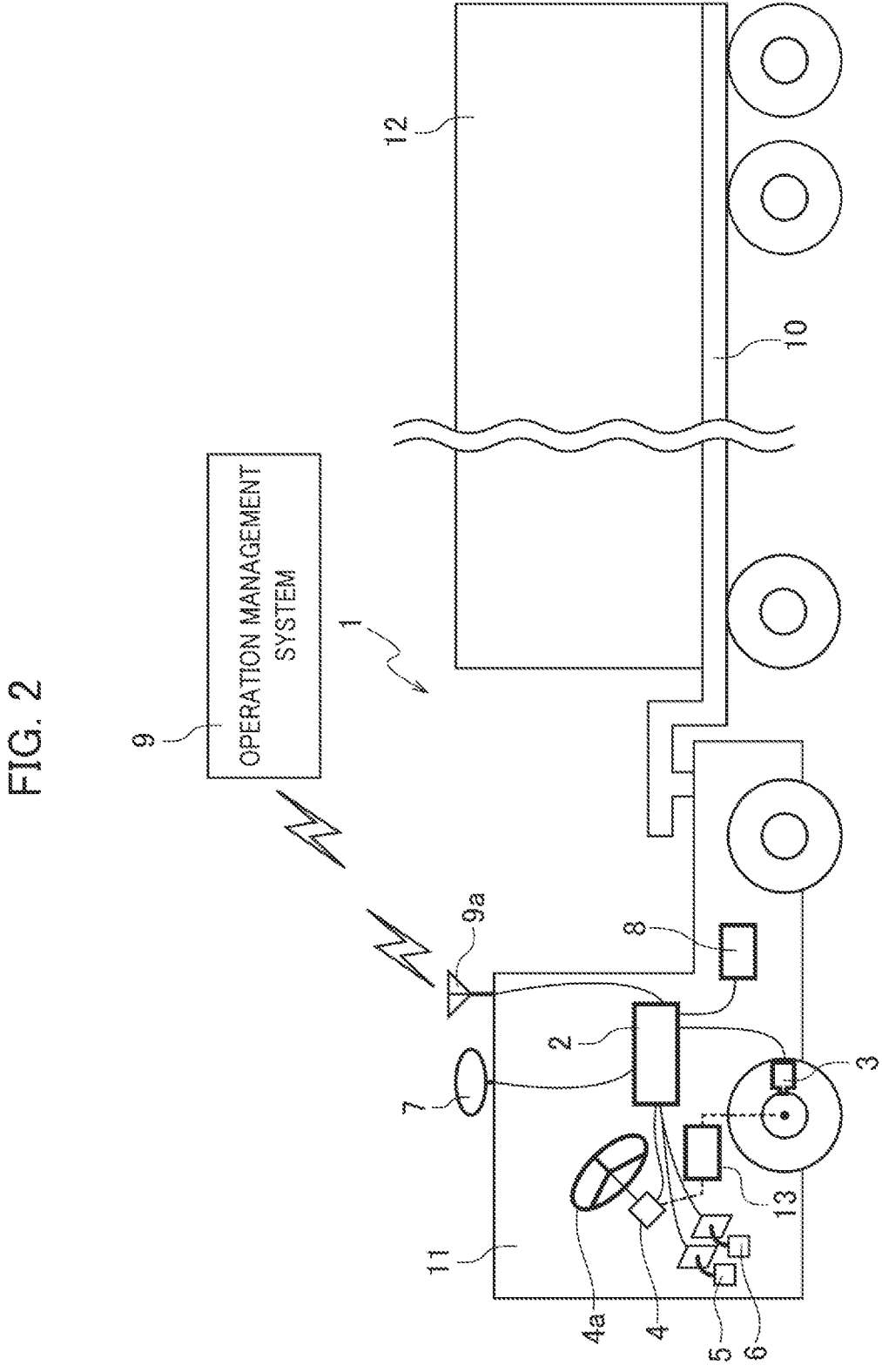
FIG. 2 is a configurational diagram of a determination apparatus of a center of gravity position according to an embodiment.

In the present embodiment, as shown in FIG. 2, a case where the vehicle 1 configured by a trailer 10, on which a loaded cargo 12 is loaded, and a tractor 11, which tows the trailer 10, is described as an example. The tractor is also referred to as a trailer head. Although the connected trailer 10 and tractor 11 as a whole may also be referred to as a trailer, descriptions will be made based on the configuration in which the trailer 10 and tractor 11 in the connected state comprise the vehicle 1.

In addition, in the present embodiment, a case in which the determination of the center of gravity position is done when the above-mentioned vehicle 1 is operated in a business site such as a specific factory will be used as an example. For example, the determination of the center of gravity position is done during in-site running when a large product manufactured at the factory is loaded on the trailer 10 and shipped from the factory (or during in-site running after an arrival at the factory). In the site like this, a running speed of a large vehicle is limited to 5 km/h or less, or 10 km/h or less, etc., so the running speed can be treated as known (or, an influence to a turning radius caused by the running speed can be ignored).

Note that, even also during running on public roads, there is a case where a running route may be predetermined and a vehicle speed may be treated as a known parameter (or its influence can be ignored) when transporting a large loaded cargo at night with traffic control and traffic management. A large loaded cargo includes, for example, a train car, part of an aircraft or a rocket, and part of a bridge. Such a large loaded cargo often tends to become unstable when loaded on a trailer (vehicle), and thereby the determination of a center of gravity position according to the present embodiment is advantageous. And, even also in such a case where a running route is known and a vehicle speed can be treated as a known parameter (or its influence on turning characteristics can be ignored), the determination of a center of gravity position can be done similarly to the above-mentioned in-site running (which may include running by autonomous driving).

In addition, it is assumed here that the in-site running is done by autonomous driving. Since not only a running speed but also a running route can be specified in the site, it is easier to introduce autonomous driving than on public roads. Furthermore, since it is easier to create a detailed three-dimensional map (or even a two-dimensional map) of a running route in the site, it is easier to introduce autonomous driving. Furthermore, since roads in the site are not public roads and they may be exempt from the Road Traffic Law, it is easier to introduce autonomous driving. The determination apparatus and the determination method of a center of gravity position of the present disclosure are very useful for such an autonomous driving in a site.

FIG. 2 shows a configurational diagram of a determination apparatus of a center of gravity position according to the present embodiment. As described above, the vehicle 1 is configured by the tractor 11 and the trailer 10, and the trailer 10 is loaded with a container as the loaded cargo 12. The driving type of the vehicle 1 can take any type, such as an internal combustion engine vehicle (ICV), an electric vehicle (BEV/FCEV), or a hybrid electric vehicle (HEV). A cargo(s) is usually loaded in a container so that the center of gravity of whole of them is on a front-back center line of the vehicle 1. However, if a cargo shift occurs inside the container, the center of gravity of the loaded cargo 12 may shift. The determination apparatus of a center of gravity position is equipped with sensors that detect various parameters indicating conditions of the vehicle 1 and so on and a controller 2 that controls the determination of the center of gravity position. The controller 2 is a computer and includes a CPU and a memory 21 in which a program for determining a center-of-gravity and so on are stored. The controller 2 may be a controller integrated with other systems installed on the vehicle 1, and the controller 2 of the present embodiment also controls the autonomous driving.

The vehicle 1 includes a speed sensor 3, a steering angle sensor 4, an accelerator pedal stroke sensor 5 and a brake pedal stroke sensor 6 as sensors that detect the various parameters indicating the conditions, and these sensors are connected to the controller 2. Note that these sensors may be connected to the controller 2 via a controller of another system (e.g., engine ECU, ABS/VSC-ECU or the like). That is, the detected values of these sensors may be supplied to the controller 2 via the controller of the other system.

The speed sensor 3 detects an actual running speed of the vehicle 1 (actual vehicle speed) from rotations of an axle shaft of the tractor 11. Note that the actual vehicle speed may be obtained based on detection results of a self-location detector (a self-location history) described below (in this case, the self-location detector and the controller 2 configure the speed sensor). The steering angle sensor 4 detects a steering angle of the steering wheel 4a (a steering angle request value). In the present embodiment, relationship between the steering angle of the steering wheel 4a (the steering angle request value) and the steered angle of the steered road wheels (the steering angle control value) is controlled in a one-to-one relationship in a situation for determining a center of gravity position. The steering angle sensor 4 is a steering detector that detects a control value relating to the steering control (the steering control values) such as the steering angle request value or the steering angle control value.

For example, when a steer-by-wire system is used for an autonomous driving control or a vehicle stability control (VSC), there may be a case where the steering angle request value and the steering angle control value don't have a one-to-one relationship. If an autonomous driving system, instead of a driver, controls steering of the vehicle 1, the driver does not operate the steering wheel 4a, so that no steering angle request value exists and the autonomous driving system determines the steering angle control value to steer the steered road wheels. In addition, if the vehicle stability control calculates the steering angle control value by correcting the steering angle request value, the steering angle request value and the steering angle control value are not fixed in a one-to-one relationship. However, since the steering angle control value can be calculated based on the steering angle request value when the steering angle request value exists, the steering angle control value can be obtained from the steering angle request value.

Note that a complete steer-by-wire system is not adopted in the vehicle 1 of the present embodiment and the steered road wheels are controlled so as to be steered by the steering angle control value using an actuator 13 of the power steering system during the autonomous driving (the steering wheel also turns). Therefore, the steering angle control value can also be directly detected by detecting a state of the actuator 13. For example, if the actuator 13 is a servo motor, its control state can be detected, so the steering angle control value can also be directly detected. In the present embodiment, the actuator 13 of the power steering system functions as a turning controller that controls the turning motion of the vehicle 1.

In addition, a speed-responsive variable gear ratio steering (VGS) system or a four-wheel steering (4WS) system may be adopted to improve vehicle maneuverability at low speeds. The VGS system is a system that increases a ratio of the steered angle of the steered road wheels (the steering angle control value) to the steering angle of the steering wheel (the steering angle request value), i.e., a gear ratio at low speeds (variably controls the ratio depending on the vehicle speed). The steered road wheels are steered more in relation to the steering angle of the steering wheel at low speeds than at high speeds, and thereby the vehicle maneuverability can be improved. In addition, since rear wheels are steered to an opposite side with respect to the front wheels (steered road wheels) at low speeds in the 4WS system, the vehicle maneuverability can be improved. Unlike passenger cars, a vehicle configured by a tractor and a trailer or a truck often has four or more wheels, but it is called the 4WS system here including such a case.

Since the steering angle control value is calculated based on the steering angle request value when the steering angle request value exists in these cases, the steering angle control value can be obtained from the steering angle request value. In the present embodiment, determination of a center of gravity position is done based on the steering angle request value. Even when these auxiliary systems are integrated into the steering system, the above-mentioned steering detector (the steering angle sensor 4 in the present embodiment) is a sensor that detects a control value relating to the steering control (a steering control value). The steering control value is the steering angle request value or the steering angle control value, or alternatively both of them.

The accelerator pedal stroke sensor 5 is a sensor that detects an operated stroke of the accelerator pedal (a driving force request value). Similar to the steering angle sensor 4 described above, when an accelerator-by-wire system or the VSC system is used, the driving force request value and the driving force control value may not be fixed in a one-to-one relationship. There is a case, when a hybrid system is adopted, where the driving force may be generated by an internal combustion engine and a motor in response to the driving force request value, and the driving force control value may be set separately for each. If an autonomous driving system, instead of a driver, controls driving of the vehicle 1, the driver does not operate the accelerator pedal, so no driving force request value exists and the autonomous driving system determines the driving force control value to drive the vehicle 1. However, similarly here, since the driving force control value is calculated based on the driving force request value when the driving force request value exists, the driving force control value can be obtained from the driving force request value.

The brake pedal stroke sensor 6 is a sensor that detects an operated stroke of the brake pedal (a braking force request value). Similar to the steering angle sensor 4 and the accelerator pedal stroke sensor 5 described above, when a brake-by-wire system, the ABS system or the VSC system is used, the braking force request value and the braking force control value may not be fixed in a one-to-one relationship. There is a case, when a hybrid system is adopted, where the braking force may be generated by a fluid pressure brake (an oil pressure brake or an air brake) and a regenerative power generation brake with respect to the braking force request value, and the braking force control value may be set separately for each. If an autonomous driving system, instead of a driver, controls driving of the vehicle 1, the driver does not operate the brake pedal, so no braking force request value exists and the autonomous driving system determines the braking force control value to run the vehicle 1. However, similarly here, since the braking force control value is calculated based on the braking force request value when the braking force request value exists, the braking force control value can be obtained from the braking force request value.

As mentioned above, the autonomous driving system installed in the vehicle 1 is controlled by the controller 2. Therefore, various actuators for automatically controlling the steering of the steered road wheels and the driving/braking of the vehicle 1 can also be controlled by the controller 2. The controller 2 controls these actuators (e.g., the above-mentioned actuator 13 of the power steering system) during the autonomous driving. In addition, the autonomous driving system also has a self-location detection function for the vehicle 1 as part of its system. Specifically, the autonomous driving system has the self-location detector that uses a GPS system (a GPS antenna 7) and a gyro sensor (an inertial sensor) 8 together. That is, the GPS system (the GPS antenna 7), the gyro sensor 8 and the controller 2 configure the self-location detector that detects the self-location of the vehicle 1. The self-location data of the vehicle is acquired by the self-location detector.

Note that the term GPS used here is used as a term that refers to not only the U.S. satellite positioning system but also satellite positioning systems in general. In addition, this also includes systems that use multiple satellite positioning systems simultaneously (e.g., simultaneous use of the U.S. GPS, Russia's GRONASS, and Japan's MICHIBIKI). Furthermore, if no autonomous driving system is installed in the vehicle but such a navigation system is installed, the determination apparatus of a center of gravity position can utilize the self-location detection function of the navigation system.

Furthermore, the autonomous driving system (the controller 2 of the vehicle 1) in the present embodiment includes a communication function (a communication antenna 9*a*) to communicate with an operation management system 9, and the controller 2 sends and receives various running-related data via wireless communication to and from the operation management system 9. For example, the running-related data includes reference data (a judgment map) as described below, operation data such as a running route and a running speed for the autonomous driving, specifications of the vehicle 1, specifications of the loaded cargo 12 and so on. The specifications of the vehicle 1 include weights, dimensions, center of gravity positions of the tractor 11 and trailer 10, and so on. The specifications of the loaded cargo 12 include its weight, its dimensions, its center of gravity position, and so on.

The controller 2 can receive the operation data and the reference data via the operation management system 9 (the communication antenna 9a) and store them in its internal memory 21. Note that the operation management system 9 in the present embodiment communicates wirelessly with the vehicle 1, but it may also communicate wired. In the case of wired communication, data are sent and received using a connecting cable before the start of operation, and then the connecting cable is removed. Alternatively, data may also be exchanged via a storage medium or the like without communication.

Figure 3:
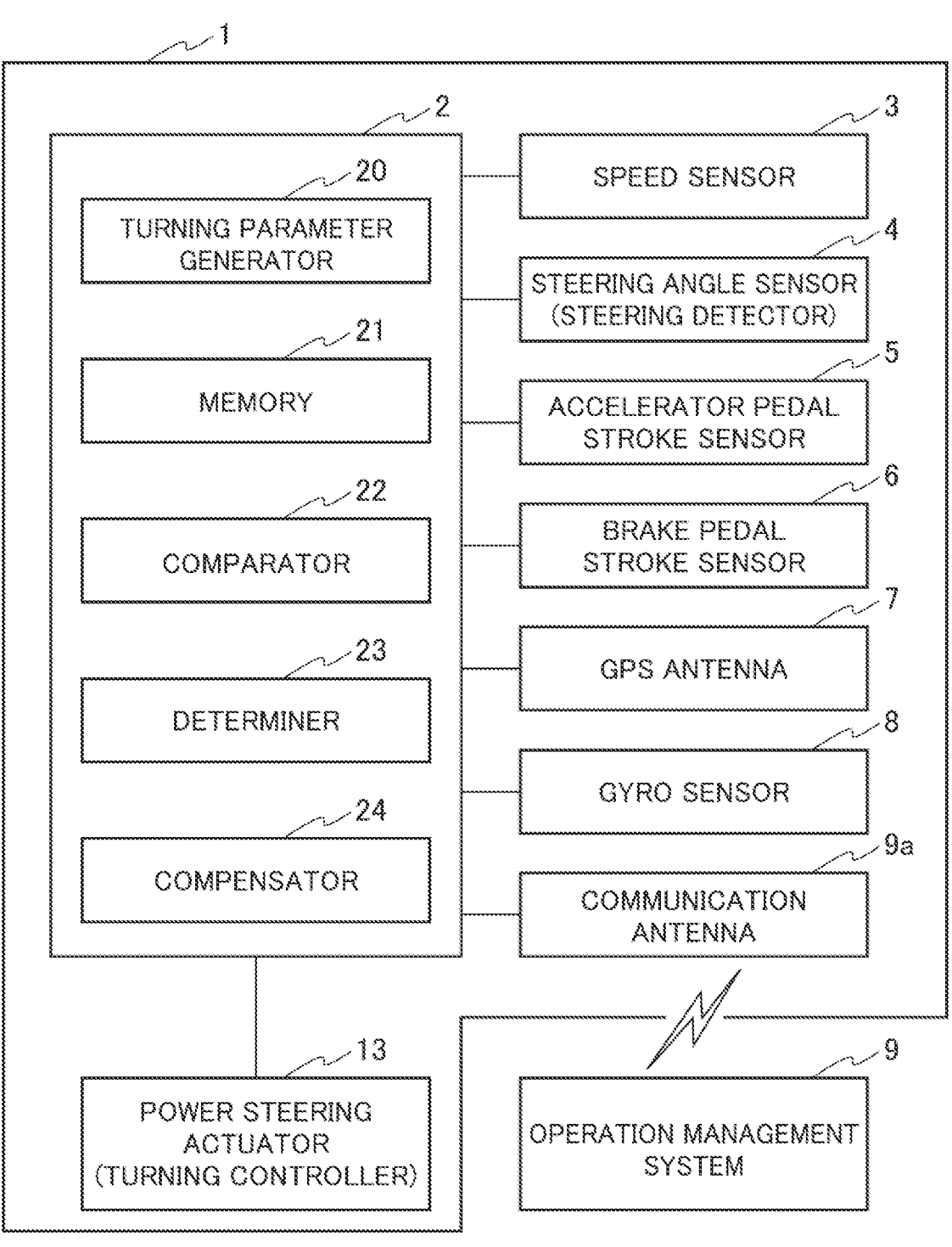
FIG. 3 is a block diagram of the determination apparatus of a center of gravity position.

FIG. 3 shows a block diagram of circumferences of the controller 2. As shown in FIG. 3, the controller 2 is connected to the above-mentioned sensors. In addition, the controller 2 also has a turning parameter generator 20, a comparator 22, a determiner 23 and a compensator 24 in addition to the above-mentioned memory 21. The turning parameter generator 20 calculates the turning parameter (the turning curvature in the present embodiment) based on the self-location data detected by the above-mentioned self-location detector. The comparator 22 compares the turning parameter (the turning curvature) calculated by the turning parameter generator 20 and the steering control value (the steering angle request value in the present embodiment) detected by the steering angle sensor (the steering detector) 4 with the reference data described below.

The determiner 23 determines the center of gravity position of the cargo 12 (or the center of gravity position of the vehicle 1 with the cargo 12 loaded) based on the comparison results of the comparator 22. The determination of the center of gravity position means determining what the actual center of gravity position is in relation to the center of gravity position when the cargo is loaded in the vehicle 1 in a predetermined state (e.g., in a proper loading state). The compensator 24 adjusts an input to the turning controller (the actuator 13 of the power steering system) based on the comparison results by the comparator 22. The turning parameter generator 20, the comparator 22, the determiner 23 and the compensator 24 are realized by the program for determining a center of gravity, the CPU that executes the program and so on that are described above.

Here, the reference data will be explained with reference to FIG. 4. The reference data are data that indicates the relationship between the turning parameter (the turning curvature) and the steering control value (the steering angle) when the cargo 12 is in a predetermined state, and are the determination map that is referred to when determining the center of gravity position. That is, the reference data store the relationships between the steering angle and the turning curvature in a state where the vehicle 1 turns at a certain turning curvature while the steering wheel 4a of the vehicle 1 with the cargo 12 loaded is steered at a certain steering angle. In the present embodiment, the running speed (vehicle speed) is known as described above, and the determination of the center of gravity position is done when the vehicle 1 is running at the speed.

Figure 4:
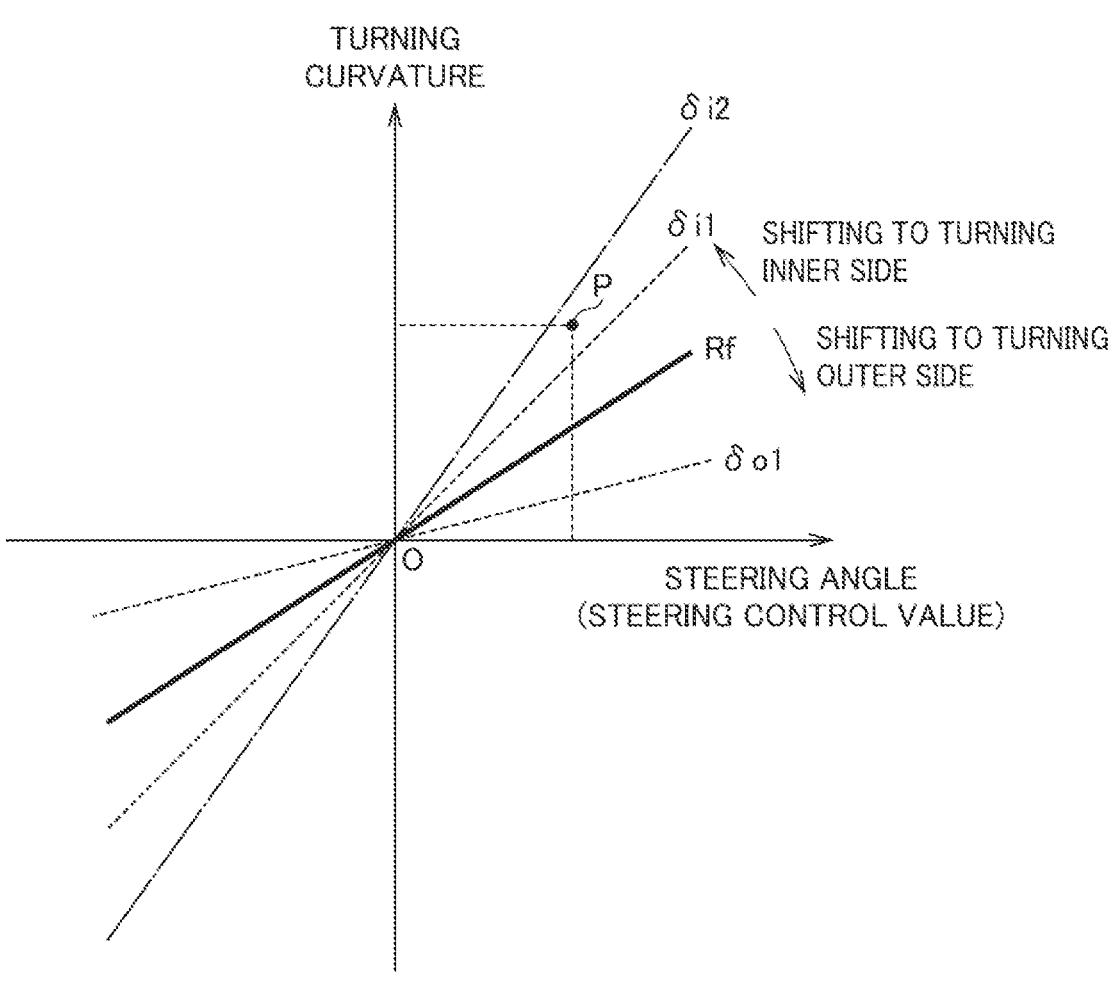
FIG. 4 is an explanatory diagram showing reference data used in the determination apparatus of a center of gravity position.

FIG. 4 shows the relationship between the steering angle and turning curvature when the center of gravity of the cargo 12 is in the proper state as a straight line Rf (reference determination line). If the center of gravity of the cargo 12 is shifted by x (>0) meters to the turning outer side, the turning characteristic (the turning curvature) changes as shown in FIG. 1B and thereby its relationship between the steering angle and the turning curvature is shown as a straight line δo1. Similarly, if the center of gravity of the cargo 12 is shifted by x meters to the turning inner side, its relationship between the steering angle and the turning curvature is shown as a straight line δi1. If the center of gravity of the cargo 12 is shifted by y (>x) meters to the turning inner side, its relationship between the steering angle and the turning curvature is shown as a straight line δi2.

Note that the steering angle for right turns is shown as positive and that for left turns is shown as negative in FIG. 4. Although only the four relationship lines are shown in FIG. 4, more relationship lines are defined for each relationship between the steering angle and the turning curvature. However, even if the reference data contains at least the reference determination line Rf, it is possible to determine whether the center of gravity is shifted or not. In such a case, it is also possible to calculate and estimate the shift of the center of gravity position based on the deviation of the detected actual steering angle and the obtained actual turning curvature from the reference determination line Rf. In addition, the relational lines between the steering angle and the turning curvature are all shown as straight lines in FIG. 4, but they may be also shown as curved lines. Furthermore, if the towed trailer 10 or the cargo 12 changes, the reference data to be referred will also change of course. The reference data (the determination maps) like these are preliminarily constructed and stored in the memory 21 of the controller 2 before the vehicle 1 runs with the cargo 12 loaded.

The above-mentioned devices (sensors) in the present embodiment are equipment that the vehicle 1 is normally equipped with, except for the controller 2. In particular, in the present embodiment, functions of the controller for autonomous driving are integrated into the controller 2 for determining a center-of-gravity position. That is, the apparatus (method) for determining a center of gravity position of the present embodiment is operated by utilizing the existing devices in the vehicle 1.

Figure 5:
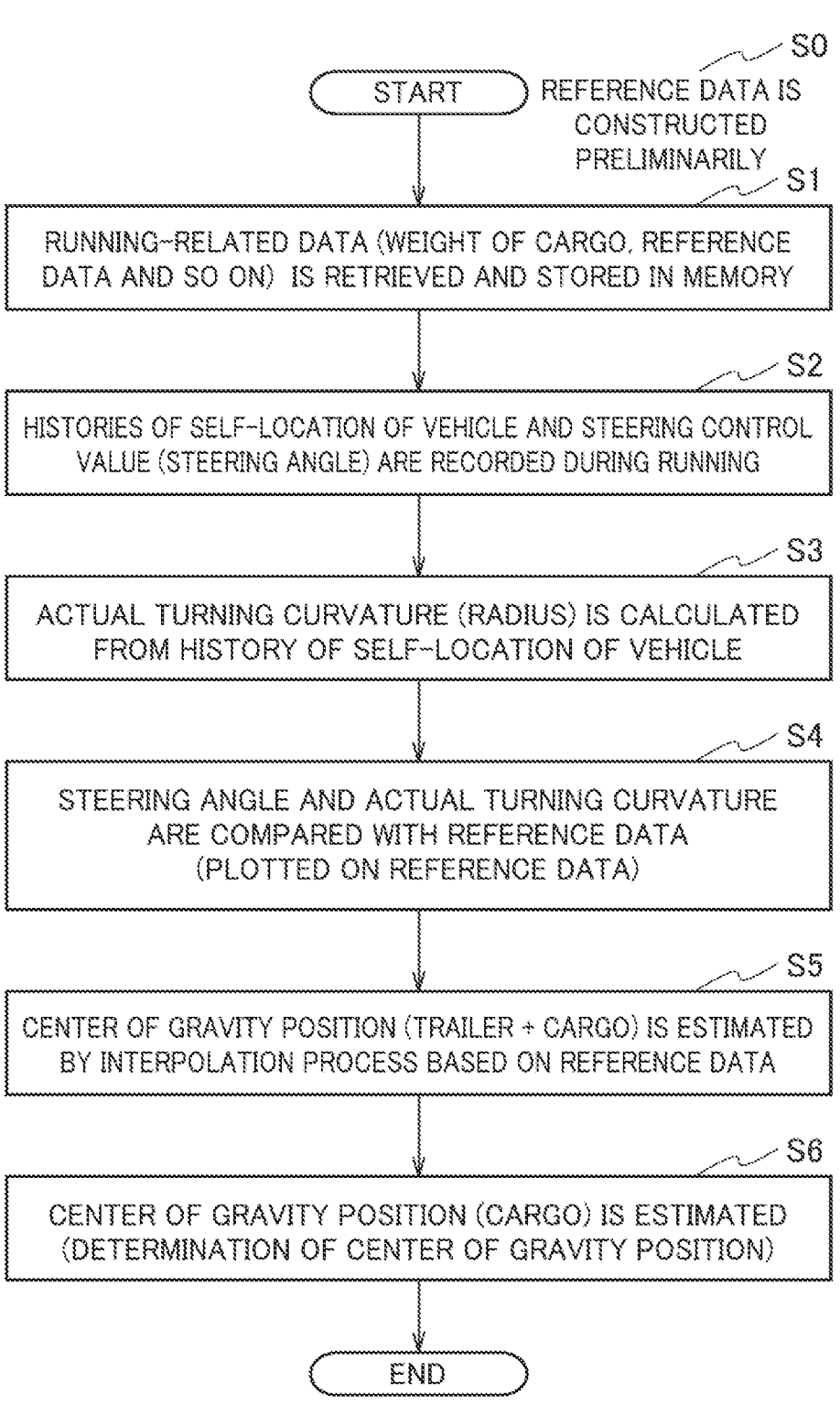
FIG. 5 is a flowchart of a determination method of a center of gravity position according to an embodiment.

A determination method of a center of gravity position of a cargo using the determination apparatus of a center of gravity position having the above-described configuration will be described with reference to a flowchart in FIG. 5. As described above, the relationship between the steering control value (the steering angle of the steering wheel 4a detected by the steering angle sensor 4, i.e., the steering angle request value in the present embodiment) and the turning curvature relative to the steering control value is preliminarily constructed as the reference data (the determination map) (step S0). The above-mentioned running-related data including the reference data is stored in the memory 21 of the controller 2 via the operation management system 9 (the communication antenna 9a) before running the vehicle 1 (step S1). The running-related data also includes the specifications of the vehicle 1 and the cargo 12 as described above, but the specifications of the tractor 11 are invariant and the specifications of the tractor 11 may be stored in the memory 21 as default.

Then, while the vehicle 1 is actually running (turning), the self-location history is stored as the self-location data by the controller 2 using the self-location detection function (devices: the GPS system including the GPS antenna 7 and the gyro sensor 8) (step S2). The steering angle of the steering wheel 4a (the steering control value) during this turning is also detected by the steering angle sensor (steering detector) 4. That is, multiple self-locations during turning (the self-location data) and the steering angles at those times are stored. Next, based on the multiple self-locations during turning (the self-location data), the turning parameter generator 20 calculates the actual turning curvature (the actual turning parameters) (step S3). The actual turning curvature is obtained from the approximated actual turning radius gotten through a circular approximation by the least-squares method using the multiple self-locations.

Next, the comparator 22 compares the actual turning curvature (the actual turning parameter) and the steering angle (the steering control value) with the reference data (step S4). Specifically, the actual turning characteristics based on the actual steering angle and the actual turning curvature are plotted on the reference data (the determination map) as shown by a point P in FIG. 4. As a result of this comparison, a schematic determination can be made about the center of gravity position of the trailer 10 with the cargo 12 loaded. Specifically in the case of the point P in FIG. 4, it can be determined that the shift of the center of gravity position of the trailer 10 with the cargo 12 loaded is more than x meters (the relationship line δi1) and less than y meters (the relationship line δi2) to the turning outer side relative to the proper state.

In the present embodiment, the interpolation process is done with respect to this schematic determination to make a more accurate determination. Since the specifications of the trailer 10 and the cargo 12 are stored in the memory 21, the determiner 23 estimates (determines) the shift of the center of gravity position based on the deviation between the point P and the relational lines δi1 and δi2 through calculation using this data (step S5). For example, if x=0.25 meters and y=0.50 meters with respect to point P, the interpolation process estimates that the center of gravity position is displaced 0.38 meters to the turning outer side.

The center of gravity position estimated in the step S5 is the center of gravity position of the trailer 10 with the cargo 12 loaded. In the present embodiment, from this center of gravity position, the determiner 23 estimates (determines) the center of gravity position of the cargo 12 only (step S6). Since the specifications of the trailer 10 are stored in memory 21 as described above, the determiner 23 estimates (determines) the center of gravity position of the cargo 12 through calculation using this data.

Note that the process may be terminated when the center of gravity position of the entire vehicle 1 with the cargo 12 loaded is estimated (determined) in step S4. Alternatively, the center of gravity position of only the cargo 12 may be estimated (determined) based on the center of gravity position of the entire vehicle 1 with the cargo 12 loaded after estimating (determining) the center of gravity position of the entire vehicle 1. Since the specifications of the vehicle 1 (the tractor 11 and the trailer 10) are stored in the memory 21 also in this case, the center of gravity position of the cargo 12 can be estimated (determined) through calculation using this data.

As described above, the vehicle 1 can be driven autonomously, and the autonomous driving is controlled by the controller 2. In the present embodiment, based on the comparison results of the above-mentioned comparator 22, i.e., based on the determined shift of the center of gravity position, the compensator 24 of the controller 2 adjusts the input to the actuator 13 of the power steering system (the turning controller) so as to eliminate the shift. Since this adjustment compensates the steered angle of the steered road wheels so that the turning curvature (radius) during turning becomes the proper turning curvature (radius), the vehicle 1 can be turned accurately.

In the above embodiment, the case in which the determination of the center-of-gravity position is done during in-site turning such as a business site is explained as an example, and the vehicle speed is treated as a known parameter (or its influence on turning characteristics can be ignored). That is, the reference data (the determination map) is created under the condition that the vehicle speed of the vehicle 1 is constant. This prevents the reference data from becoming complex and enables accurate determination of the center of gravity position. However, the apparatus and method of the present disclosure can also be applied when running on public roads where a vehicle speed changes in sequence, and, in such cases, determination of a center of gravity position based on turning characteristics can be done by treating the vehicle speed as a parameter as well. In this case, the appropriate turning curvature (radius) may change depending on the steering control value and the vehicle speed. In such a case, the reference data (the determination map) may be constructed in consideration of the vehicle speed as well.

In addition, the memory 21 stores multiple reference data (Rf, δi1, δi2, δo1 and so on) corresponding to different center of gravity positions as shown in FIG. 4. This allows a quicker determination of a center of gravity position. Note that it is also possible to omit the above-mentioned interpolation process by creating the reference data in more detail. However, more detailed creation of the reference data requires more time for conformity work or the like, and thus more man-hours are needed. Therefore, the man-hours required to create the reference data are reduced by using the interpolation process in the present embodiment.

Conversely, it is also possible to define only the reference determination line Rf in the reference data (the determination map) and to obtain the shift of the center of gravity position by the interpolation process based only on the reference determination line Rf as described above. However, if the memory 21 stores multiple reference data (Rf, δi1, δi2, δo1 and so on) corresponding to different center of gravity positions as in the present embodiment, computational load can be reduced and a center of gravity position can be determined more accurately.

The reference data (the determination map) is preliminarily constructed before the determination of the center of gravity position. The construction is done by modeling the vehicle 1 (trailer 10 and tractor 11) and the cargo 12 and then executing simulation and so on. However, data that are acquired during actual driving of the vehicle 1 for which the center of gravity position of the cargo 12 has been confirmed to be appropriate, may be used to construct the reference data. That is, the reference data can be constructed during actual driving of the vehicle 1. In this case, a program for constructing the reference data is stored in the memory 21 of the controller 2, and the controller 2 constructs the reference data using this program. In this way, the reference data can be constructed efficiently.

The data for constructing the reference data (the determination map) can be acquired by the sensors installed in the vehicle (e.g., the speed sensor 3, the self-location detector and the steering detector) and is independent of whether or not a vehicle height sensors are present. Therefore, the reference determination line Rf shown in FIG. 4 can be obtained using data acquired during actual driving of the vehicle 1 for which the center of gravity position of the cargo 12 has been confirmed to be appropriate. Then, based on the reference determination line Rf, other relation lines (δi1, δi2, δo1 and so on) are defined through simulation or the like. Of course, it is also possible to obtain other relation lines by running the vehicle 1 with the center of gravity position of the cargo 12 shifted intentionally. Alternatively, the reference determination line Rf itself may also be obtained by simulation or the like.

In a case of creating the reference data (the determination map) by using actual driving of the vehicle 1 in this way, it should be confirmed that the center of gravity position of the cargo 12 is appropriate when the vehicle 1 is driven. To confirm this, for example, it may be considered that an operator measures an actual center of gravity position after loading the cargo 12 onto the vehicle 1 to confirm that it is appropriate. If the specifications of the cargo 12 are clearly known, it may be possible to determine the center of gravity position without measurement.

Alternatively, it may be possible that the center of gravity position of the cargo 12 is confirmed to be in the proper position by checking the loading condition with a camera after the cargo 12 is loaded onto the vehicle 1. If the specifications of the cargo 12 are clearly known, it can be confirmed that its center of gravity position is appropriate only by checking with a camera in this way. Alternatively, it may be possible to confirm that the center of gravity position is appropriate by measuring the weight acting on each road wheels using an axle weight meter or the like after the cargo 12 is loaded onto the vehicle 1.

As mentioned above, the various devices (sensors) for determining the center of gravity position in the present embodiment are equipment that vehicles are normally equipped with. Although the present embodiment is equipped with the autonomous driving system and the operation management system 9, these are not essential for determination of a center of gravity position. If the vehicle 1 is equipped with a navigation system, the self-location detection function of the navigation system can be used for determination of a center of gravity position. That is, according to the present embodiment, the center of gravity position of the cargo loaded on the vehicle (or that of the vehicle) can be determined regardless of whether the vehicle is equipped with height sensors or not.

Note that the turning curvature is used as the turning parameter in the above embodiment. However, since the turning curvature is the reciprocal of the turning radius, the turning radius may also be used as a turning parameter. In other words, detecting the turning curvature is equivalent to detecting the turning radius. That is, in the present disclosure, detecting the actual turning curvature is equal to detecting the actual turning radius. Similarly, the reference data (the determination map) that stores the relationship between the steering control value and the turning radius is equivalent to the determination map that stores the relationship between the steering control value and the turning curvature.

Note that a parameter that includes a running distance and a change in running direction in a pair may also be used as a turning parameter. In other words, a parameter that can determine (approximatively) what kind of a curved line is drawn by a running locus can be used as a turning parameter.

In addition, the GPS antenna 7 and the gyro sensor 8 are used as the self-location detector in the above embodiment, but the self-location detector is not limited to this. For example, if the vehicle 1 is equipped with a SLAM (Simultaneous Localization And Mapping) system as part of the autonomous driving function, this SLAM system can also be used as the self-location detector. Alternatively, it is easy to establish roadside-to-vehicle communication by installing markers or communication devices along running road as long as in-site such as business site, and facilities including these devises can be adopted as the self-location detector.

In addition, the vehicle 1 in the above embodiment is configured by the trailer 10 with the cargo 12 loaded and the tractor 11 towing this trailer 10. Although the trailer 10 can swing with respect to the tractor 11 in a plan view, the vehicle 1 in which the self-location detector is installed can be a truck in which such swinging cannot occur. Even with trucks, it is possible to determine a center of gravity position using the turning characteristics described above. Note that the center of gravity position of the cargo 12 is determined based on the center of gravity position of the trailer 10 with the cargo 12 loaded in the above-described embodiment. However, the center of gravity position of the entire vehicle with the cargo 12 loaded (the tractor 11+the trailer 10+the cargo 12) may be determined. If the vehicle 1 is a truck or other vehicle that has no part that is towed, such as the trailer 10, there is not much difference whether the center of gravity position of the vehicle 1 or the center of gravity position of the cargo is determined.

What is claimed is:

1. A determination apparatus of a center of gravity position, the apparatus comprising:

a vehicle on which a cargo is loadable and which includes a turning controller that controls a turning motion of the vehicle;

a self-location detector that acquires self-location data of the vehicle;

a turning parameter generator that calculates a turning curvature or a turning radius as a turning parameter based on a circular approximation of an actual self-location history of the vehicle by using the self-location data and a least-squares method;

a steering detector that detects a steering control value of the vehicle;

a memory that stores reference data that indicates relationship between the turning parameter and the steering control value when the cargo is in a proper loading state in which a center of gravity position of the cargo is located on a front-back center line of the vehicle;

a comparator that compares the turning parameter calculated by the turning parameter generator and the steering control value detected by the steering detector with the reference data;

a determiner that determines a center of gravity position of the vehicle or the cargo based on comparison results of the comparator; and a compensator that adjusts an input to the turning controller based on the comparison results.

2. The determination apparatus of the center of gravity position according to claim 1, wherein the reference data is created under a condition where a speed of the vehicle is constant.

3. The determination apparatus of the center of gravity position according to claim 1, wherein the memory stores a plurality of reference data corresponding to different center of gravity positions.

4. A determination method of a center of gravity position of a vehicle on which a cargo is loadable or of the cargo, the vehicle including a turning controller that controls a turning motion of the vehicle, the method comprising:

constructing, as reference data, relationship between a steering control value of the vehicle and a turning curvature or a turning radius, which serves as a turning parameter, corresponding to the steering control value when the cargo is in a proper loading state in which a center of gravity position of the cargo is located on a front-back center line of the vehicle, preliminarily;

calculating the turning parameter based on a circular approximation of an actual self-location history of the vehicle by using a self-location detection function of the vehicle and a least-squares method;

determining the center of gravity position of the vehicle or the cargo by comparing the steering control value used for an actual turning and the turning parameter calculated based on the self-location history with the reference data; and adjusting an input to the turning controller based on comparison results of the steering control value and the turning parameter.

5. The determination method of the center of gravity position according to claim 4, wherein the reference data is constructed by treating also a speed of the vehicle as a parameter, and wherein the steering control value used for the actual turning, the turning parameter calculated based on the self-location history and a detected actual speed of the vehicle are compared with the reference data.

6. The determination method of the center of gravity position according to claim 4, wherein the reference data is constructed during an actual running of the vehicle.

\* \* \* \* \*